(12) United States Patent
Lee

(10) Patent No.: US 9,902,382 B2
(45) Date of Patent: Feb. 27, 2018

(54) BRAKE MASTER CYLINDER

(71) Applicant: MANDO CORPORATION, Pyeongtaek-si (KR)

(72) Inventor: Youn Lee, Pyeongtaek-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 402 days.

(21) Appl. No.: 14/700,120

(22) Filed: Apr. 29, 2015

(65) Prior Publication Data
US 2015/0314762 A1 Nov. 5, 2015

(30) Foreign Application Priority Data

Apr. 30, 2014 (KR) .......................... 10-2014-0052028

(51) Int. Cl.
*B60T 11/16* (2006.01)
*B60T 7/04* (2006.01)
*B60T 11/20* (2006.01)

(52) U.S. Cl.
CPC ............. *B60T 11/165* (2013.01); *B60T 7/042* (2013.01); *B60T 11/20* (2013.01)

(58) Field of Classification Search
CPC .... B60T 11/165; B60T 11/24; B60T 2220/04; F15B 15/2861
USPC ...................................... 92/165 PR
See application file for complete search history.

(56) References Cited

U.S. PATENT DOCUMENTS

| | | | |
|---|---|---|---|
| 4,742,193 A * | 5/1988 | Kassin .................... | B60T 11/16 200/61.89 |
| 4,914,916 A * | 4/1990 | Leigh-Monstevens ......... | B60T 17/226 324/207.2 |
| 6,381,959 B1 * | 5/2002 | Tsubouchi ............ | B60T 11/165 60/562 |
| 6,573,708 B1 * | 6/2003 | Hiramatsu .......... | F15B 15/2846 324/207.17 |
| 6,732,517 B2 * | 5/2004 | Zehnder, II ............... | B60T 8/38 60/534 |
| 6,823,725 B2 * | 11/2004 | Lohberg ................. | G01D 5/145 324/207.13 |

(Continued)

FOREIGN PATENT DOCUMENTS

| CN | 1212337 | 3/1999 |
|---|---|---|
| CN | 102774368 | 11/2012 |

(Continued)

OTHER PUBLICATIONS

Office Action dated Jul. 17, 2017 for Chinese Patent Application No. 201510206768.9 and its English machine by Global Dossier.

*Primary Examiner* — Michael Leslie
*Assistant Examiner* — Matthew Wiblin
(74) *Attorney, Agent, or Firm* — Ladas & Parry, LLP

(57) ABSTRACT

Disclosed is a brake master cylinder. The brake cylinder includes a cylinder body, a first piston and a second piston that are provided in the cylinder body so as to perform a reciprocating motion, and a hall sensor installed outside the cylinder body and configured to sense operations of the first and second pistons to control on/off of a brake lamp. The brake master cylinder is provided with a magnet installed on the first piston, and a rotation preventing member configured to limit rotation of the first piston, wherein as rotation of the first piston is limited, the magnet is installed at a portion of the first piston that faces the hall sensor.

4 Claims, 5 Drawing Sheets

(56) References Cited

U.S. PATENT DOCUMENTS

| | | | | |
|---|---|---|---|---|
| 7,219,495 B2 * | 5/2007 | Ludsteck | ............... | F16D 25/088 60/584 |
| 2007/0182403 A1 * | 8/2007 | von Hayn | ................ | B60T 7/042 324/207.24 |

FOREIGN PATENT DOCUMENTS

| | | | | |
|---|---|---|---|---|
| CN | 102996689 | | 3/2013 | |
| CN | 202764954 | | 3/2013 | |
| CN | 202811934 | | 3/2013 | |
| CN | 103640568 | | 3/2014 | |
| DE | 10356299 A1 * | 7/2004 | ............... B60T 7/042 |
| GB | 956440 A * | 4/1964 | ............ B60T 11/165 |
| KR | 10-1085801 | | 11/2011 | |

* cited by examiner

BRAKE MASTER CYLINDER

CROSS-REFERENCE TO RELATED APPLICATION

This application claims the benefit of Korean Patent Application No. 2014-0052028, filed on Apr. 30, 2014, with the Korean Intellectual Property Office, the disclosure of which is incorporated in its entirety herein by reference.

BACKGROUND

1. Field

Embodiments of the present disclosure relate to a brake master cylinder.

2. Description of the Related Art

In general, a brake master cylinder for a vehicle is provided to be applied to a brake liquid pressure control apparatus for a vehicle, and is configured to transmit brake oil, which is introduced to the inside of the vehicle through a reservoir, to a wheel cylinder provided at each wheel by pressurizing the brake oil.

The brake master cylinder is provided with a device configured to turn on and off a brake lamp by sensing an operation of a piston according to a pedal force so that it is checked whether a vehicle is performing a braking operation. An example of the technology is disclosed in Korean Patent Registration No. 10-1085801, which relates to a master cylinder that turns on and off a brake lamp by using a hall sensor.

In the above document, the brake cylinder includes a ring-shaped magnet installed on a piston so as to move together with the piston according to a pedal force, and a hall sensor installed at a cylinder body, in which the piston is provided so as to reciprocate, at a position corresponding to a position of the magnet. The hall sensor detects the intensity of a magnetic force according to movement of the magnet installed on the piston, and transmit the detected intensity of the magnetic force to an electronic control unit (ECU) of the brake system, and the ECU regulates the on/off of a brake lamp that displays the status of braking operation of the vehicle based on a signal of the intensity.

Meanwhile, a piston may be rotated during an assembly or an operation of a brake master cylinder, and thus the positions of the hall sensor and the magnet may be mismatched, so that the hall sensor fails to properly detect the magnetic force of the magnet and the movement of the piston is not precisely detected. For this reason, a ring-shaped magnet is installed on the piston so that the movement of the piston is stably detected.

However, when the ring-shaped magnet is installed on the piston, a spring needs to be additionally installed to prevent the magnet from adhering to the piston, or an additional member needs to be processed to install the magnet on the piston, which complicates the installation structure.

In addition, since a ring-shaped magnet needs to be manufactured in consideration of rotation of the piston, a larger amount of magnet is required, which increase the manufacturing cost.

PRIORITY ART DOCUMENT

Korean Patent Registration No. 10-1085801 (Continental Teves, Nov. 16, 2011)

SUMMARY

Therefore, it is an aspect of the present disclosure to provide a brake master cylinder capable of reducing the material cost for a magnet by allowing a magnet to be installed only at a portion of a piston facing a hall sensor by limiting rotation of the piston such that the magnet is directed at one orientation.

Additional aspects of the disclosure will be set forth in part in the description which follows and, in part, will be obvious from the description, or may be learned by practice of the disclosure.

In accordance with one aspect of the present disclosure, a brake master cylinder including a cylinder body, a first piston and a second piston that are provided in the cylinder body so as to perform a reciprocating motion, and a hall sensor installed outside the cylinder body and configured to sense operations of the first and second pistons to control on/off of a brake lamp, the brake master cylinder including: a magnet installed on the first piston; and a rotation preventing member configured to limit rotation of the first piston, rotation preventing member wherein as rotation of the first piston is limited, the magnet is installed at a portion of the first piston that faces the hall sensor.

The rotation preventing member may include a guide groove that is formed lengthwise along an inner circumferential surface of the first piston, and a fixing member that is fixed to the cylinder body and provided with a guide rod inserted into the guide groove.

The guide rod may have a length corresponding to a length of the guide groove, and the guide groove and the guide rod may have predetermined lengths that prevent the guide rod from being separated from the guide groove during reciprocation of the first piston.

The fixing member may include: a fixing part mounted on the cylinder body; a body part extending from the fixing part to surround an outer circumferential surface of the first piston; and a guide rod provided at a position of the body part that corresponds to a position of the guide groove.

The body part may be spaced apart from the outer circumferential surface of the first piston to prevent reciprocation of the first piston from being disrupted by the body part.

The guide rod may be integrally formed with the body part by bentedly extending from a portion of the body part.

The rotation preventing member may include a guide groove that is formed lengthwise along an outer circumferential surface of the first piston and a fixing member that is fixed to the cylinder body and provided with a guide rod inserted into the guide groove.

The body part may be spaced apart from the outer circumferential surface of the first piston to prevent reciprocation of the first piston from being disrupted by the body part, and the guide rod may be provided to be inserted into the guide groove As is apparent from the above, the brake master cylinder allows a magnet to be installed only at a portion of a piston facing a hall sensor by limiting rotation of the piston such that the magnet is directed at one orientation. Accordingly, the magnet has a smallness in size when compared to the conventional ring-shaped magnet that is installed in a full circumferential direction of a piston, thereby reducing the material cost for a magnet.

In addition, there is no need to additionally process the master cylinder or use an additional member, such as a spring, to install a magnet, thereby facilitating the manufacturing process, and achieving a simple structure of the brake master cylinder.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
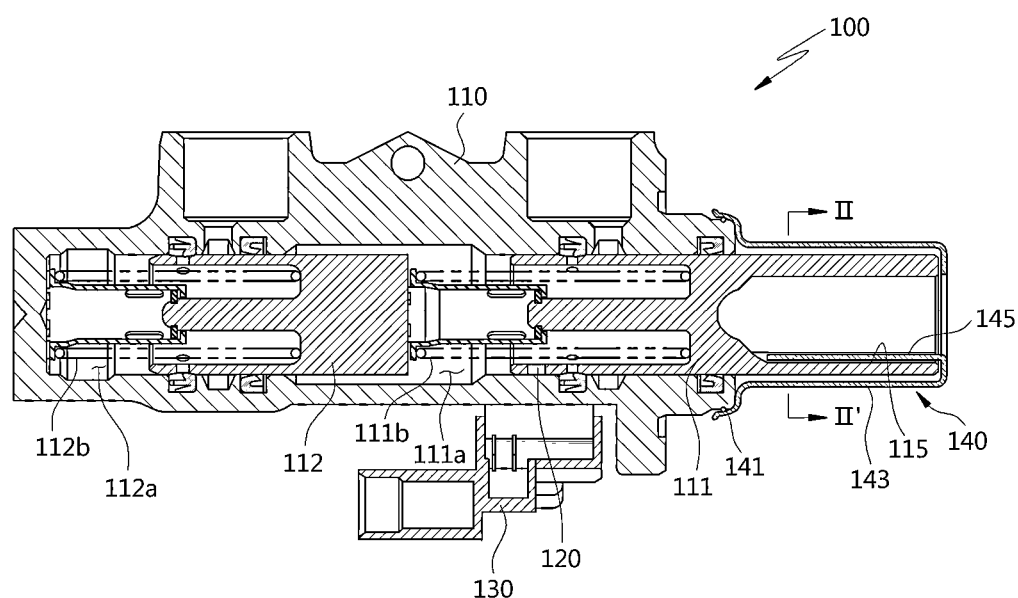
FIG. 1 is a cross sectional view schematically illustrating a brake master cylinder according to an embodiment of the present disclosure.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

Figure 2:
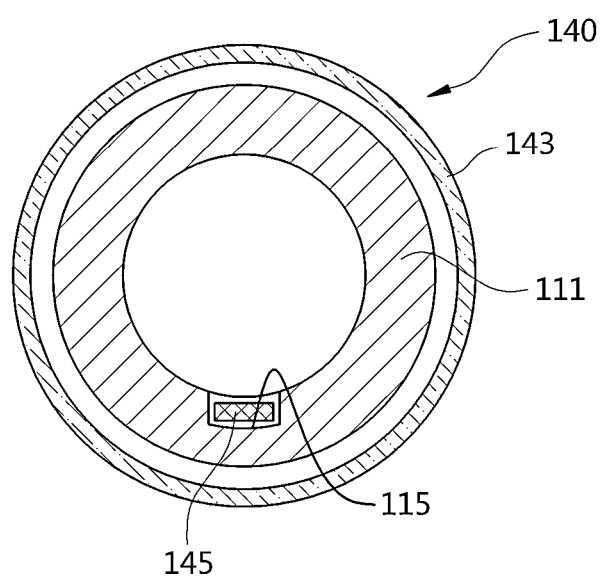
FIG. 2 is a cross sectional view taken along line II-II' of FIG. 1.

FIG. 1 is a cross sectional view schematically illustrating a brake master cylinder according to an embodiment of the present disclosure, and FIG. 2 is a cross sectional view taken along line II-II' of FIG. 1.

Referring to FIGS. 1 and 2, a brake master cylinder 100 according to an embodiment of the present disclosure includes a cylinder body 110 provided in the form of a cylinder having one side thereof of and the other side thereof closed, a first piston 111 and a second piston 112 that are provided in the cylinder body 110 so as to slidably reciprocate according to a brake pedal (not shown) operation of a driver, a magnet 120 installed on the first piston 111, and a hall sensor 130 installed at an outside of the cylinder body 110 and configured to sense a magnetic force.

At an upper side of the brake master cylinder 100, a reservoir (not shown) storing oil to be supplied to the master cylinder 100 is installed. In addition, an output shaft of the master cylinder 100 receives a pressure difference according to an operation of an input shaft (not shown) connected to a brake pedal (not shown), and pushes the first and second pistons 111 and 112 of the master cylinder 100 to transmit a hydraulic pressure to a wheel cylinder (not shown), thereby generating a braking force.

The cylinder body 110 is provided at an inside thereof with a first liquid pressure chamber 111a formed between the first piston 111 and the second piston 112 in which a liquid pressure is generated, and the cylinder body 110 is also provided with a second liquid pressure chamber 112a formed between the second piston 112 and an inner wall of the other end of the cylinder body 110 in which a liquid pressure is generated. The liquid pressure chambers 111a and 112a are provided with a first return spring 111b and a second return spring 112b, respectively, to return the first piston 111 and the second piston 112, respectively. The structure of the master cylinder 100 is generally known in the art, and thus details thereof will be omitted.

The master cylinder 100 includes a hall sensor 130 configured to control on/off of a brake lamp according to operations of the pistons 111 and 112 and a magnet 120 configured to transmit a magnetic force to the hall sensor 130. The hall sensor 120 is installed at an outer side of the cylinder body 110, and the magnet 120 is installed on a position of the first piston 111 facing the hall sensor 130. In this case, the magnet 120 is installed on the first piston 111 such that rotation of the first piston 111 exposed to the outside of the cylinder body 110 is limited and the magnet 120 is directed at an orientation.

According to the embodiment of the present disclosure, the brake master cylinder 100 includes a rotation preventing member to limit rotation of the first piston 111.

The rotation preventing member limiting rotation of the first piston 111 includes a guide groove 115 that is formed lengthwise along an inner circumferential surface of the first piston 111 and the fixing member 140 that is provided with a guide rod 145 inserted into the guide groove 115. Accordingly, rotation of the first piston 111 is limited by the guide rod 145 inserted by the guide groove 115.

Figure 3:
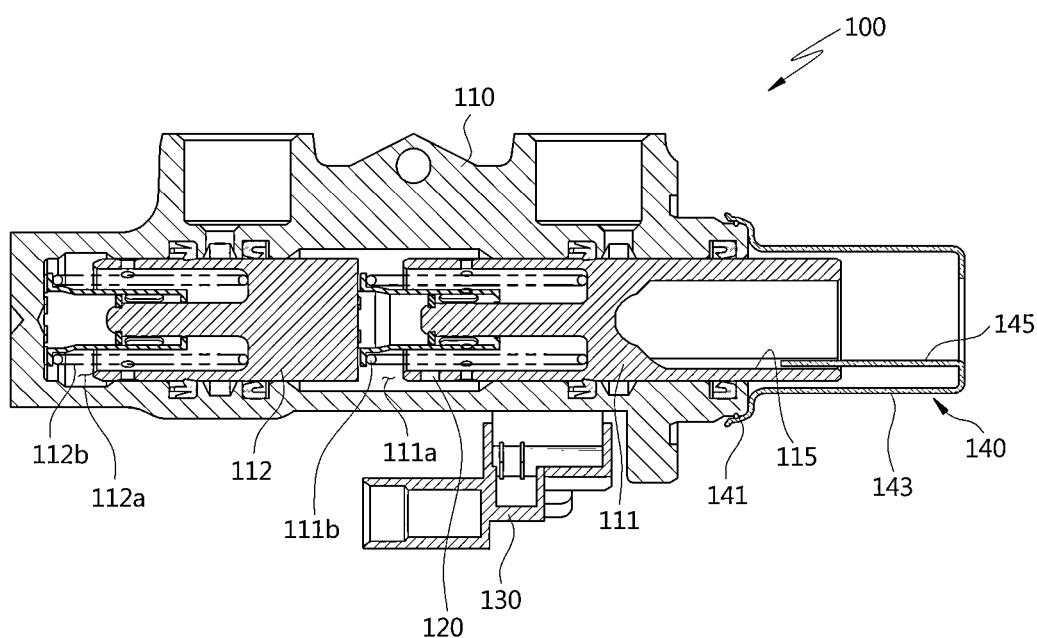
FIG. 3 is a cross sectional view illustrating an operation state of a brake master cylinder according to an embodiment of the present disclosure.

The guide groove 115 is provided with a predetermined length, and the guide rod 145 has a length corresponding to a length of the guide groove 115. The guide groove 115 and the guide rod 145 have lengths that prevent the guide rod 145 from being separated from the guide groove 115 during reciprocation of the first piston 111. That is, even if the first piston 111 is moved while pressed as shown in FIG. 3, the guide rod 145 remains inserted into the guide groove 115 without separated from the guide groove 115. Such a configuration is provided to prevent the first piston 111 from being rotated during reciprocation of the first piston 111, and to move the first piston 111 only in a linear direction. Accordingly, the magnet 120 installed on the first piston 111 may be directed at one orientation.

Meanwhile, the fixing member 140 limiting rotation of the first piston 111 includes a fixing part 141 mounted on the cylinder body 110, a body part 143 extending from the fixing part 141 to surround an outer circumferential surface of the first piston 111, and the guide rod 145 formed at a position of the body part 143 that corresponds to the guide groove 115. In this case, the guide rod 145 is integrally formed with the body part 143 by bentedly extending from a portion of the body part 143. That is, the fixing member 140 may be provided as an integral body.

Accordingly, since the position of the guide rod 145 is fixed by the fixing part 141 fixed to the cylinder body 110, and the guide rod 145 is inserted into the guide groove 115, rotation of the first piston 111 is limited. In addition, the body part 143 is spaced apart from the outer circumferential surface of the first piston 111 to prevent reciprocation of the first piston 111 from being disrupted by the body part 143.

Since rotation of the first piston 111 is limited by the rotation preventing member, even if the magnet 120 is installed only on a portion of the first piston 111 facing the hall sensor 130, the hall sensor 130 may effectively sense the magnetic force. That is, as shown in the drawings, the magnet 120 is installed only at a portion of the first piston 111 facing the hall sensor 130, for example, at a lower end portion of the first piston 111, thereby enabling smallness in size when compared to a general ring-shaped magnet that is installed on a piston in a circumferential direction, and thus reducing the material cost of the magnet.

Figure 4:
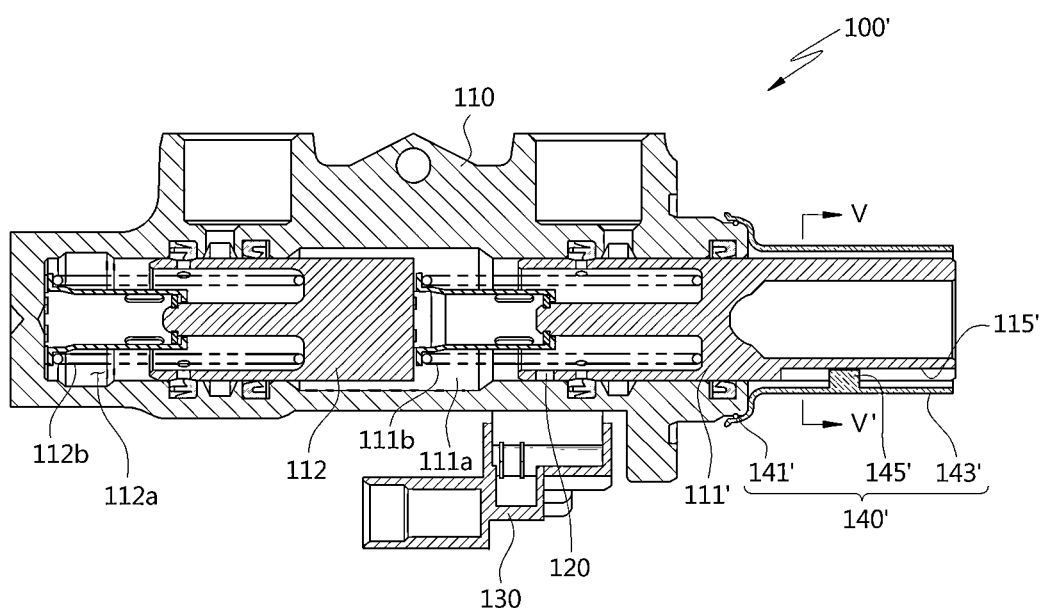
FIG. 4 is a cross sectional view illustrating a brake master cylinder according to another embodiment of the present disclosure.
Figure 5:
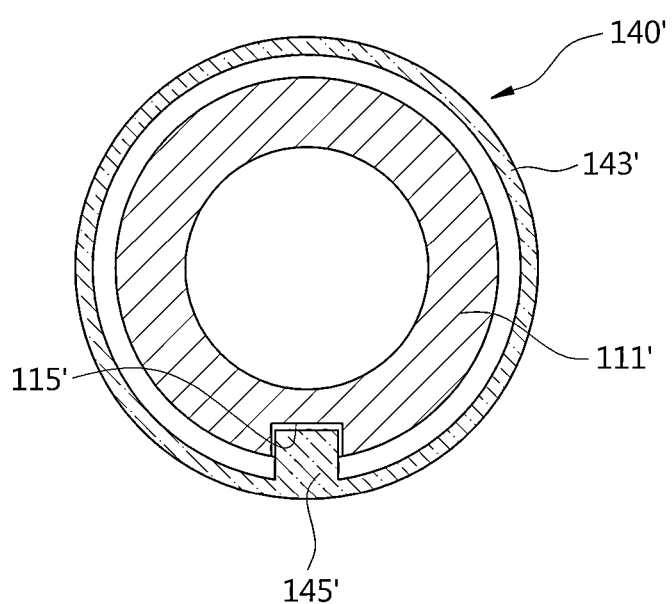
FIG. 5 is a cross sectional view taken along line V-V' of FIG. 1.

Although the brake master cylinder 100 according to the embodiment of the present disclosure is provided with the guide groove 115 formed at the inner circumferential surface of the first piston 111, and rotation of the first piston 111 is limited by the fixing member 140 insertedly coupled to the guide groove 115, the present disclosure is not limited thereto, and the brake master cylinder may be provided in various structure as long as it prevents rotation of the first piston 111. For example, FIGS. 4 and 5 illustrate a brake master cylinder 100' according to another embodiment of the present disclosure that prevents rotation of a first piston 111'. In the following description, the same reference numerals are used to refer to the same elements in the previous embodiment.

A rotation preventing member provided on the brake master cylinder 100' according to the embodiment of the present disclosure includes a guide groove 115' that is formed lengthwise along an outer circumferential surface of a piston 111' and a fixing member 140' that is provided with a guide rod 145' inserted into the guide groove 115'. That is, rotation of the first piston 111' is limited by the guide rod 145 inserted into the guide groove 115' formed on the outer circumferential surface of the first piston 111'.

The fixing member 140' limiting rotation of the first piston 111' includes a fixing part 141' mounted on the cylinder body 110, a body part 143' extending from the fixing part 141' to surround an outer circumferential surface of the first piston 111', and the guide rod 145' formed at a position of the body part 143' corresponding to the guide groove 115'. The body part 143' is spaced apart from the outer circumferential surface of the first piston 111' to prevent reciprocation of the first piston 111' from being disrupted by the body part 143'. The guide rod 145' is configured to be inserted into the guide groove 115' to prevent rotation of the first piston 111'. Different from the above embodiment of the present disclosure, the guide rod 145'a is formed at the inner circumferential surface of the body part 143', and the guide groove 115' is formed in the outer circumferential surface of the first piston 111'.

As the above, when the first piston 111' reciprocates in a state in which the guide rod 145' is inserted into the guide groove 115', the guide rod 145' remains inserted in the guide groove 115' without separated from the guide groove 115'. Accordingly, the first piston 111' is prevented from being rotated during reciprocation of the first piston 111', and linear movement of the first piston 111' is guided, so that the magnet 120 installed on the first piston 111' may be directed at one orientation. As such, rotation of the first piston 111' is limited by the rotation preventing member, the magnet 120 may be installed only at a portion of the first piston 111' facing the hall sensor 130, for example, at a lower end portion of the first piston 111', thereby reducing the amount of magnet when compared to a general ring-shaped magnet.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A brake master cylinder, comprising:
   a cylinder body;
   a first piston and a second piston that are provided in the cylinder body so as to perform a reciprocating motion;
   a hall sensor installed outside the cylinder body and configured to sense operations of the first and second pistons to control on/off of a brake lamp;
   a magnet installed on the first piston; and
   a rotation preventing member configured to limit rotation of the first piston,
   wherein, the magnet is installed at a portion of the first piston that faces the hall sensor,
   wherein the rotation preventing member comprises a guide groove formed lengthwise along an inner circumferential surface of the first piston; and a fixing member fixed to the cylinder body and provided with a guide rod inserted into the guide groove, and
   wherein the fixing member comprises a fixing part mounted on the cylinder body; a body part extending from the fixing part to surround an outer circumferential surface of the first piston; and the guide rod provided at a position of the body part that corresponds to a position of the guide groove.

2. The brake master cylinder of claim 1, wherein the guide rod has a length corresponding to a length of the guide groove, and
   the guide groove and the guide rod have predetermined lengths that prevent the guide rod from being separated from the guide groove during reciprocation of the first piston.

3. The brake master cylinder of claim 1, wherein the body part is spaced apart from the outer circumferential surface of the first piston to prevent reciprocation of the first piston from being disrupted by the body part.

4. The brake master cylinder of claim 1, wherein the guide rod is integrally formed with the body part by bentedly extending from a portion of the body part.

\* \* \* \* \*